Patented Nov. 23, 1954

2,695,297

N-PYRIDOXYL-AMINES

Dorothea Heyl Hoffman, Rahway, Stanton A. Harris, Westfield, and Karl Folkers, Plainfield, N. J., assignors to Merck & Co., Inc., Rahway, N. J., a corporation of New Jersey No Drawing. Application August 10, 1950, Serial No. 178,764

6 Claims. (Cl. 260—296)

This invention is concerned generally with novel derivatives of pyridoxal. More particularly it relates to N-pyridoxyl substituted amines, and to the preparation of these compounds by condensing pyridoxal with primary amines and hydrogenating the Schiff base thus produced.

This application is a continuation-in-part of application Serial No. 792,618, filed December 18, 1947, now Patent No. 2,540,946.

These novel N-pyridoxyl-amines, and in particular those derived from naturally-occurring amino acids, act as depressors, that is, as agents which are useful in lowering blood pressure. These compounds may be coupled with aromatic diazonium compounds to yield colored products which are useful as dyes. These compounds are also of value as growth-promoting agents.

These N-pyridoxyl-amines may be chemically represented as follows:

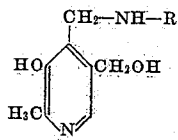

wherein R is an alkyl, aryl, aralkyl or heterocyclic radical. Examples of these N-pyridoxyl-amines are: N-pyridoxyl-aniline, N-pyridoxyl-benzylamine, N-pyridoxyl-pyridoxamine, N-pyridoxyl-methylamine, N-pyridoxyl-ethylamine, N-pyridoxyl-phenylpropylamine, and the like. The preferred N-pyridoxyl-amines are the N-pyridoxyl-hydroxy-alkylamines, such as N-pyridoxyl-β-hydroxy-ethylamine, N-pyridoxyl-β-hydroxy-propylamine, N-pyridoxyl-polyhydroxy-aralkylamines such as N-pyridoxyl-3,4-dihydroxy-β-phenylethylamine and N-pyridoxyl-polyhydroxyaryl-hydroxyalkylamines such as N-pyridoxyl-arterenol, that is N-pyridoxyl-β-hydroxy-β-(3,4-dihydroxy-phenyl)-ethylamine. We particularly prefer the N-pyridoxyl-amines in which the parent amine, (RNH₂) is derived from a naturally-occurring amino acid, as for example N-pyridoxyl-tyramine, N-pyridoxyl-tryptamine, N-pyridoxyl-β-phenyl-ethylamine, N-pyridoxyl-histamine, and the like.

We have discovered that these N-pyridoxyl-amine compounds can be prepared by reacting pyridoxal with the appropriate amine to form a Schiff's base which is then hydrogenated to produce the desired N-pyridoxyl-amine. The general method of preparing secondary amines by reacting aldehydes with primary amines and reducing the Schiff's bases thus formed is, of course, a well-known text-book procedure. The possibility that such a procedure, starting with pyridoxal, would be applicable for the preparation of the herein disclosed N-pyridoxyl-amines was, however, extremely remote. Pyridoxal is not an ordinary aldehyde but is a complex polyfunctional heterocycle possessing several reactive groupings. Previously it had been found that pyridoxal, in solution, instead of existing in the form wherein the substituent in the 4-position is an aldehyde grouping, ordinarily exists in the form of a hemiacetal wherein the carbon atom attached to the 4-position of the pyridine nucleus is bridged to the methylene grouping attached to the 5-position by means of an ether linkage. Since pyridoxal, in solution, contains no free aldehyde grouping, it would have been expected that pyridoxal would not react with primary amines to form Schiff's bases.

Moreover, when we attempted to prepare Schiff's bases by reacting pyridoxal with certain primary amines, such as histamine and the dihydroxy-phenylethylamines, the products thus obtained were not the corresponding Schiff's bases but were, instead, polycyclic compounds. For example, when pyridoxal and histamine are condensed in aqueous alcohol, the product obtained is not a Schiff's base but is a white material which melts at approximately 252–253° C. dec., and which does not absorb hydrogen under the conditions described hereinabove for preparing N-pyridoxyl-amines. Similarly, when pyridoxal is reacted with a dihydroxy-phenylethylamine and the reaction is carried out in a single soluble phase, as for example in alcohol solution, an intra-molecular ring formation occurs and the product obtained is not a Schiff's base but is, instead, a quinoline derivative.

We have now discovered, however, an improved procedure whereby this intramolecular ring formation can be avoided and whereby pyridoxal can be reacted with primary amines (including histamine and the dihydroxy-phenylethylamines) followed by hydrogenation to produce the corresponding N-pyridoxyl-amines. This is accomplished by conducting the reaction in a medium comprising a substantially anhydrous lower aliphatic alcohol such as ethanol, methanol, and the like, under which conditions the desired pyridoxal-amine Schiff's base is formed.

In some instances, the Schiff's base, which is usually a yellow compound, may be conveniently recovered from the reaction mixture. For example, when pyridoxal and histamine are reacted together in substantially anhydrous alcohol solution, the yellow pyridoxal-histamine Schiff's base (M. P. 240–241° C.) precipitates and may be recovered by filtration. When this yellow pyridoxal-histamine compound is reacted with hydrogen, the compound (in contrast to the white pyridoxal-histamine hereinabove referred to) absorbs hydrogen to form N-pyridoxyl-histamine.

It is ordinarily preferred, however, particularly when preparing N-pyridoxyl-dihydroxyphenylethylamines, to subject the alcoholic reaction solution, substantially in the form obtained by reacting pyridoxal and primary amine in absolute alcohol, to the action of hydrogen, in the presence of a hydrogenation catalyst, such as platinum. In fact, the condensation between pyridoxal and dihydroxyphenylethylamines is best carried out in a combination of liquid and solid phases and in the presence of the hydrogen reducing agent. This is conveniently accomplished by dissolving the hydrochloride of the dihydroxyphenylethylamine in a lower aliphatic alcohol, such as methanol, adding solid pyridoxal and a hydrogenation catalyst, then adding pellets of sodium hydroxide and immediately subjecting the resulting mixture to hydrogenation. As the starting materials slowly dissolve and react, the intermediate product is hydrogenated to produce the desired N-pyridoxyl-dihydroxyphenylethylamine.

As noted hereinabove, the N-pyridoxyl-amines, prepared according to the present invention, act as depressors, which action is particularly surprising in view of the fact that the corresponding parent amines, tyramine, tryptamine and β-phenylethylamine all act as pressors, that is, as agents which raise the blood pressure. Moreover, the intermediate Schiff base, obtained by the condensation of pyridoxal and the amine does not exhibit the depressor activity, characteristic of the hydrogenated product, the N-pyridoxyl-amine.

In addition to the above-mentioned depressor activity, these N-pyridoxyl-amines have also been found to show a high order of vitamin B₆ activity. For example, N-pyridoxyl-isopropanol amine, N-pyridoxyl-phenylpropylamine, N-pyridoxyl-aniline, N-pyridoxyl-tyramine, N-pyridoxyl-isobutylamine, N-pyridoxyl-tryptamine, N-pyridoxyl-β-phenylethylamine, N-pyridoxyl-ethylamine and N-pyridoxyl-ethanolamine, when bioassayed for vitamin B₆ potency by the curative method with rats, exhibited from 75 to 100% of the activity shown by vitamin B₆ itself. All other N-pyridoxyl-amines tested likewise exhibited significant, although somewhat lower, vitamin B₆ activity. The fact that the N-pyridoxyl-amines show vitamin B₆ activity is particularly unexpected in view of the fact that it was previously considered that vitamin $B_6$ owes its physiological action to the molecule as an entity, which conclusion was based on the discovery that previously known components of very similar structure, as well as simple derivatives of vitamin $B_6$, were found to be inactive.

The following examples illustrate methods of carrying out the present invention, but it is to be understood that these examples are given by way of illustration and not of limitation.

EXAMPLE 1

About 4.15 gms. of tyramine and about 5.06 gms. of pyridoxal are suspended in about 100 cc. of absolute methyl alcohol. After 5 minutes standing, a clear yellow solution is obtained. This solution is filtered, diluted to about 150 cc. with methyl alcohol, 0.2 mg. of Adams' platinum catalyst is added and the resulting mixture is shaken under hydrogen at a pressure of approximately 2–3 atmospheres for approximately ½ hour. The catalyst is removed by filtration, the colorless solution is cooled in an ice bath, and alcoholic hydrogen chloride is added slowly until the solution is acid to Congo red. The solution is cooled for an additional period of time and the crystals which precipitate are filtered and washed with alcohol and ether to produce approximately 9.6 gms. of N-pyridoxyl-tyramine dihydrochloride; M. P. 238–239° C.; yield approximately 88% of theory.

EXAMPLE 2

About 3.62 gms. of β-phenyl-ethylamine and about 5.00 gms. of pyridoxal are dissolved in 150 cc. of absolute methyl alcohol and the resulting mixture stirred for approximately ½ hour, at which time the reaction is substantially complete. The bright yellow solution thus obtained is filtered and evaporated to dryness under reduced pressure. The residual material is recrystallized from ether-petroleum ether, and dried to produce approximately 6.90 gms. of pyridoxal-β-phenyl-ethylamine; yield approximately 86% of theory. This product is further purified by two recrystallizations from alcohol-ether-petroleum ether to produce substantially pure material; M. P. 101.5–102.0° C.

100 cc. of absolute methyl alcohol containing 4.78 gms. of pyridoxal-β-phenylethylamine and about 0.1 gm. of Adams' platinum catalyst is shaken under hydrogen at a pressure of approximately 2–3 atmospheres until the theoretical amount of hydrogen has been absorbed, and the solution has become colorless. The catalyst is removed by filtration and the filtrate evaporated to approximately 30 cc. Alcoholic hydrogen chloride is added, while cooling the resulting mixture by immersion in an ice bath, until the solution is acid to Congo red. The crystals which separate from the solution are recovered and dried to produce approximately 5.18 gms. of N-pyridoxyl-β-phenylethylamine dihydrochloride; yield approximately 85% of theory. This product is further purified by two recrystallizations from methyl alcohol-ether to produce substantially pure material; M. P. 227–228° C.

EXAMPLE 3

About 1.00 gm. of tryptamine and about 1.04 gms. of pyridoxal are dissolved in 40 cc. of absolute ethyl alcohol and the resulting mixture stirred for approximately 5 minutes, at which time the reaction is substantially complete. The clear yellow solution thus obtained is filtered and evaporated to dryness under reduced pressure. The residual material is recrystallized from ethyl alcohol and dried to produce approximately 1.4 gms. of pyridoxal-tryptamine; M. P. 160.5–161.0° C.; yield approximately 73% of theory.

125 cc. of absolute methyl alcohol containing 1.00 gm. of pyridoxal-tryptamine and about 0.1 gm. of Adams' platinum catalyst is shaken under hydrogen at a pressure of approximately 2–3 atmospheres until the theoretical amount of hydrogen has been absorbed and the solution has become colorless. The catalyst is removed by filtration and the filtrate evaporated to about 30 cc. Alcoholic hydrogen chloride is added, while cooling the resulting mixture by immersion in an ice bath, until the pH of the solution is approximately 6.0 Ether is then added to the resulting alcoholic solution to precipitate the crude monohydrochloride, which is recrystallized from aqueous alcohol to produce 0.95 gm. of substantially pure N-pyridoxyl-tryptamine hydrochloride; M. P. 222.5–223.0° C.; yield approximately 84% of theory.

EXAMPLE 4

About 3.31 gms. of pyridoxamine and about 3.30 gms. of pyridoxal are shaken with about 400 cc. of ethyl alcohol for approximately 5 hours at which time the reaction is substantially complete. The resulting solution is clarified by filtration and the filtrate evaporated to dryness under reduced pressure. The residual material is recrystallized from ethyl alcohol and dried to produce approximately 4.19 gms. of pyridoxal-pyridoxamine; M. P. 232–233° C.; yield approximately 67% of theory.

400 cc. of ethyl alcohol containing about 2 gms. of pyridoxal-pyridoxamine was shaken with 0.15 gm. of Adams' platinum catalyst under 2–3 atmospheres of hydrogen. After removal of the catalyst by filtering, the solution was concentrated to dryness. The residue was dissolved in ethyl alcohol, cooled in an ice bath, and made acid to Congo red by the dropwise addition of alcoholic hydrogen chloride. The crystals of N-pyridoxyl-pyridoxamine dihydrochloride, after filtering and washing with alcohol, were obtained in a yield of 0.74 g.; yield approximately 30% of theory. After two recrystallizations from aqueous alcohol, the melting point was 222–223° C. dec. Analysis—Calc'd for $C_{16}H_{23}N_3O_4Cl_2$: C, 48.98; H, 5.01; N, 10.71. Found: C, 49.42; H, 6.23; N, 10.63.

EXAMPLE 5

About 0.68 gm. of tyramine and about 0.83 gm. of pyridoxal are dissolved in 35 cc. of absolute methyl alcohol and the resulting mixture is stirred for approximately 5 minutes at which time the reaction is substantially complete. The resulting solution is filtered and evaporated to dryness under reduced pressure. The residual material is recrystallized 4 times, first from alcohol, and then from alcohol-ether-petroleum ether to produce approximately 1.28 gms. of pyridoxal-tyramine; M. P. 168.0–168.5° C.; yield approximately 90% of theory.

About 125 cc. of absolute methyl alcohol containing about 0.59 gm. of pyridoxal-tyramine and about 0.1 gm. of Adams' platinum catalyst, is shaken under hydrogen at pressure of approximately 2–3 atmospheres until the theoretical amount of hydrogen is adsorbed and the solution has become colorless. The catalyst is removed by filtration and the filtrate evaporated to dryness. The residual material is dissolved in ethyl alcohol and alcoholic hydrogen chloride is added to the resulting solution, with cooling, until the solution is acid to Congo Red. The crystals which separate from the solution are recovered and purified by recrystallization from water-alcohol-ether to produce approximately 0.5 gm. of N-pyridoxyl-tyramine dihydrochloride; M. P. 234–235° C.; yield approximately 66% of theory.

EXAMPLE 6

About 3 drops of aniline and about 0.1 gm. of pyridoxal are dissolved in 10 cc. of absolute ethyl alcohol, and the resulting mixture is heated at the boiling point for approximately 5 minutes, at which time the reaction is substantially complete. The resulting solution is filtered and evaporated to dryness under reduced pressure to produce substantially pure pyridoxal-aniline; M. P. 178.5–179.0° C.

1.5 gm. of pyridoxal-aniline, prepared as described above, is dissolved in 35 cc. of methyl alcohol, and the solution is hydrogenated over 0.1 g. of Adams' platinum catalyst. When the theoretical amount of hydrogen has been absorbed the catalyst is separated by filtering the hydrogenation mixture, and the filtrate is chilled and made acid to about pH 6 with alcoholic hydrogen chloride. Ether is added to the resulting solution whereupon a crystalline precipitate forms, which is recovered by filtration, washed with alcohol-ether and then with ether, and dried to produce 1.49 g. of N-pyridoxyl-aniline hydrochloride; M. P. 230–232° C.; yield 87% of theory. Analysis—Calc'd for C, 59.89; N, 6.11; N, 9.98. Found: C, 59.95; H, 6.05; N, 10.40

EXAMPLE 7

About 1.84 gm. of histamine dihydrochloride are dissolved in about 5 cc. of water and about 1.68 gm. of potassium hydroxide in about 5 cc. of water is added to this solution. About 100 cc. of ethyl alcohol is added to this solution followed by about 1.67 gm. of pyridoxal. The initial bright yellow color gradually fades and a thick white precipitate appears. The resulting mixture is allowed to stand for approximately ½ hour and then cooled in ice. The white crystalline precipitate is recovered by filtration and washed thoroughly with water followed by alcohol and then ether. The product is dried to produce approximately 0.76 gm. of pyridoxal-histamine (saturated isomer); M. P. 252–253° C. dec.: yield approximately 29% of theory.

A sample of pyridoxal histamine, prepared as described above, and dried at approximately 100° C. (1 mm. pressure) for approximately 4 hours, analyzed as follows: Analysis—Calc'd for $C_{13}H_{16}N_4O_2$: per cent C, 59.98; per cent H, 6.20; per cent N, 21.53. Found: per cent C, 60.14; per cent H, 6.10; per cent N, 21.39.

EXAMPLE 8

About 1.07 gm. of benzylamine and about 1.67 gm. of pyridoxal are dissolved in 40 cc. of absolute ethyl alcohol and the resulting mixture stirred for approximately 5 minutes, at which time the reaction is substantially complete. The reaction solution is filtered and evaporated to dryness under reduced pressure. The residual material is recrystallized from alcohol-ether-petroleum ether to produce approximately 0.9 gm. of pyridoxal-benzylamine; M. P. 113.5–114.5° C.; yield approximately 35% of theory.

75 cc. of absolute methyl alcohol containing 0.40 gm. of pyridoxal-benzylamine and about 0.1 gm. of Adams' platinum catalyst is shaken under hydrogen at a pressure of approximately 2–3 atmospheres until the theoretical quantity of hydrogen has been absorbed and the solution has become colorless. The catalyst is removed by filtration and the filtrate evaporated to dryness. The residual material is dissolved in ethyl alcohol, and alcoholic hydrogen chloride is added to the resulting solution, with cooling, until the solution is acid to Congo red. Ether is then added to the alcoholic solution to precipitate the crude dihydrochloride, and this product is recrystallized 3 times from alcohol-ether solution (a few drops of alcoholic hydrogen chloride are added during the last recrystallization) to produce approximately 0.28 gm. of N-pyridoxyl-benzylamine dihydrochloride; M. P. 219–220° C.; yield approximately 54% of theory.

EXAMPLE 9

About 2.00 gms. of isobutylamine and about 4.56 gms. of pyridoxal are dissolved in 30 cc. of absolute ethyl alcohol and the resulting mixture stirred for approximately 1 hour, at which time the reaction is substantially complete. The resulting solution is filtered and evaporated to dryness under reduced pressure. The residual material is dissolved in ether-petroleum-ether solvent by heating and the solution is cooled whereupon unreacted pyridoxal crystallizes at once and is removed by filtration. The filtrate is allowed to stand whereupon pyridoxal isobutylamine crystallizes and is recovered by filtration and dried; M. P. 67–68° C.; yield approximately 45% of theory. Analysis—Calc'd for $C_{12}H_{18}N_2O_2$: per cent C, 64.84; per cent H, 8.16; per cent N, 12.61. Found: per cent C, 64.89; per cent H, 8.05; per cent N, 12.77.

125 cc. of absolute methyl alcohol containing about 2.66 gms. of pyridoxal isobutylamine and about 0.1 gm. of Adams' platinum catalyst is shaken under hydrogen at a pressure of approximately 2–3 atmospheres until the theoretical amount of hydrogen has been absorbed and the solution has become colorless. The catalyst is removed by filtration and the filtrate is evaporated to about 30 cc. volume. Alcoholic hydrogen chloride is added with cooling until the pH of the solution is approximately 6.0. Ether is then added to the resulting solution to precipitate N-pyridoxyl-isobutylamine monohydrochloride, which is recovered by filtration and dried; M. P. 204–205° C. dec.; yield approximately 75% of theory. Analysis—Calc'd for $C_{12}H_{21}N_2O_2Cl$: per cent C, 55.27; per cent H, 8.12; per cent N, 10.75. Found: per cent C, 55.57; per cent H, 7.90; per cent N, 10.67.

EXAMPLE 10

A suspension of about 5.0 gms. of histamine dihydrochloride and 5.0 gms. of sodium bicarbonate in 150 cc. of absolute ethyl alcohol is heated at the boiling point for approximately 35 minutes. The insoluble inorganic material is recovered by filtration and the alcoholic solution treated with approximately 4.5 gms. of pyridoxal. The solution is stirred for approximately 1 hour and the resulting thick, bright yellow precipitate is recovered by filtration. Additional crystals are obtained by cooling the filtrate to produce a total yield of crude condensation product equal to approximately 2.93 gms. This material is recrystallized from alcohol to produce substantially pure pyridoxal-histamine (unsaturated Schiff base modification); M. P. 240–241° C. dec.

1.0 gm. of pyridoxal histamine, prepared as described above, is dissolved in about 300 cc. of absolute methyl alcohol, 0.1 gm. of Adams' platinum catalyst is added and the mixture shaken under hydrogen at a pressure of approximately 2–3 atmospheres until the theoretical amount of hydrogen has been absorbed. The catalyst is removed by filtration and the filtrate is evaporated to small volume and excess alcoholic hydrogen chloride added to the concentrated solution. The crude crystals which precipitate are recovered by filtration and dried to produce approximately 1.3 gm. of crude N-pyridoxyl-histamine dihydrochloride. This product is purified by three recrystallizations from ethyl alcohol-water to produce substantially pure N-pyridoxyl-histamine dihydrochloride; M. P. 236–237° C. dec.

A sample of N-pyridoxyl-histamine dihydrochloride, prepared as described above, and dried at about 100° C. (1 mm. pressure) for approximately 1½ hours, analyzed as follows: Analysis.—Calc'd for $C_{13}H_{20}N_4O_2Cl_2$: per cent C, 46.57; per cent H, 6.01; per cent N, 16.71. Found: Per cent C, 46.84; per cent H, 6.10; per cent N, 16.96.

EXAMPLE 11

Methylamine is generated by the dropwise addition of a saturated solution of methylamine hydrochloride into concentrated aqueous potassium hydroxide. The lead out tube is connected to a potassium hydroxide drying tube, and the dried methylamine is bubbled into 100 cc. of methyl alcohol containing 8.0 g. of pyridoxal in suspension. When all the pyridoxal has reacted, the bright yellow solution is filtered and chilled. The pyridoxal-methylamine which crystallizes (3.2 g., M. P. 150–151° C.) is collected on a filter and subsequently dried at 60° C. (1 mm.). Analysis.—Calc'd for $C_9H_{12}N_2O_2$: C, 59.98; N, 6.72; N, 15.55. Found: C, 60.22; H, 6.87; N, 15.34.

The filtrate from the preparation of pyridoxal-methylamine is hydrogenated in the presence of 0.2 g. of Adams' platinum catalyst. After collection of the catalyst on a filter, the filtrate is chilled, and alcoholic hydrogen chloride is added to a pH of about 6. N-pyridoxylmethylamine hydrochloride (4.28 g.; yield 66% of theory), precipitated with ether, is washed well with a mixture of alcohol and ether, followed by ether alone. It is dried at 100° C. (1 mm.) and melts at 208–209° C. Analysis.—Calc'd for $C_9H_{15}N_2O_2Cl$: C, 49.43; H, 6.91; N, 12.81. Found: C, 49.70; H, 6.87; N, 12.86.

EXAMPLE 12

A suspension of 8.0 g. of pyridoxal in 50 cc. of methyl alcohol containing 3.8 g. of ethylamine is stirred until all of the pyridoxal has reacted—about ten minutes. The solution is filtered through fine-grained sintered glass, and the excess of ethylamine is removed from the solution by a stream of nitrogen. One third of the reaction mixture is concentrated to dryness under diminished pressure, a tepid water bath being used for heating. The residue, crystallized from ether, yields 2.16 g. (yield 88% of theory) of pyridoxal-ethylamine; M. P. 108–109° C. Analysis.—Calc'd for $C_{10}H_{14}N_2O_2$: C, 61.83; H, 7.26; N, 14.43. Found: C, 62.07; H, 7.23; N, 14.69.

A solution of 6.20 g. of pyridoxal-ethylamine is reacted with hydrogen over Adams' platinum catalyst. After removal of the catalyst by filtering, the filtrate is chilled and acidified to about pH 6 with alcoholic hydrogen chloride. Crystals of N-pyridoxylethylamine hydrochloride, M. P. 184–186° C., precipitate on cooling. A second crop is obtained when ether is added to the filtrate, raising the yield to 6.96 g. (yield 92% of theory). Analysis.—Calc'd for $C_{10}H_{17}N_2O_2Cl$: C, 51.61; H, 7.38; N, 12.04. Found: C, 51.91; H, 7.16; N, 12.22.

EXAMPLE 13

A mixture of 5.00 g. of pyridoxal and 4.0 g. of γ-phenylpropylamine in 50 cc. of methyl alcohol is stirred for about 5 minutes. The practically clear solution is filtered and chilled. N-pyridoxal-γ-phenylpropylamine is obtained in a yield of 1.57 g. (the rest of the material remains in solution). After recrystallization from ether-petroleum ether this product melts at 87–89° C. Analysis.—Calc'd for $C_{17}H_{20}N_2O_2$: C, 71.80; H, 7.09; N, 9.85. Found: C, 71.62; H, 7.07; N, 10.12.

The filtrate of N-pyridoxal-γ-phenylpropylamine (containing theoretically 6.93 g.) is hydrogenated over Adams' platinum catalyst. After the catalyst has been removed by filtering, the filtrate is chilled and made acid to about pH6 with alcoholic hydrogen chloride. Addition of ether precipitates crystals of N-pyridoxyl-γ-phenylpropylamine hydrochloride in a yield of 5.94 g. (yield 76% of theory), M. P. 180–181° C. Analysis.—Calc'd for $C_{17}H_{23}N_2O_2Cl$: C, 63.25; H, 7.18; N, 8.68. Found: C, 63.24; H, 6.99; N, 8.68.

EXAMPLE 14

To a suspension of 1.00 g. of pyridoxal in 20 cc. of methyl alcohol, 0.37 g. of hydroxyethylamine is added. Since after an hour of stirring all the pyridoxal has not reacted, a little more hydroxyethylamine and methyl alcohol is added. After an additional five hours stirring, unreacted pyridoxal is removed by filtering. The filtrate is concentrated to dryness under reduced pressure and the residue is crystallized from methyl alcohol-ether. N-pyridoxal-β-hydroxyethylamine is obtained in a yield of 1.08 g. (yield 87% of theory). After recrystallization from methyl alcohol the material melts at 148–149° C. Analysis.—Calc'd for $C_{10}H_{14}N_2O_3$: C, 57.13; H, 6.71; N, 13.32. Found: C, 57.41; H, 6.47; N, 13.03.

A solution of 1.83 g. of hydroxyethylamine in 300 cc. of absolute methyl alcohol is treated with 5.01 g. of pyridoxal. Gradually a clear yellow solution is formed, which requires twenty-four minutes for hydrogenation over 0.2 g. of Adams' platinum catalyst. The solution is filtered as quickly as possible, but a small amount of white crystalline material remains with the catalyst on the filter. After the filtrate has been cooled in an ice bath, the crystals of N-pyridoxyl-hydroxyethylamine (M. P. 174–175° C., 4.9 g.) are collected on a filter. Another 1.2 g. of material recovered from the filtrate and catalyst brings the total yield to 95% of theory. Analysis.—Calc'd for $C_{10}H_{16}N_2O_3$: C, 56.58; H, 7.60; N, 13.20. Found: C, 56.64; H, 7.66; N, 13.42.

EXAMPLE 15

To a solution of 3.15 g. of β-hydroxypropylamine in 50 cc. of methyl alcohol, 7.00 g. of pyridoxal is added with stirring. After twenty minutes the reaction mixture is filtered through sintered glass. One third of the filtrate is concentrated to dryness under reduced pressure. The resulting residue is dissolved in alcohol. Addition of ether and petroleum ether brings out crystals of N-pyridoxal-β-hydroxypropylamine in a yield of 2.21 g. (yield 70% of theory); M. P. 112–114° C. Analysis.—Calc'd for $C_{11}H_{16}N_2O_3$: C, 58.91; H, 7.19; N, 12.49. Found: C, 58.76; H, 6.91; N, 12.61.

The remaining two thirds of the solution of N-pyridoxal-β-hydroxypropylamine is hydrogenated in the presence of Adams' platinum catalyst. The product crystallizes at once and is collected on a filter together with the catalyst. The N-pyridoxyl-β-hydroxypropylamine is extracted with cold dilute hydrochloric acid, and reprecipitated with sodium bicarbonate. After collection on a filter, the material is washed with water, methyl alcohol, and ether, and then dried. The yield of N-pyridoxyl-β-hydroxypropylamine thus obtained is 6.63 g. (yield 67% of theory); M. P. 194–196° C. Analysis.—Calc'd for $C_{11}H_{18}N_2O_3$: C, 58.39; H, 8.02; N, 12.38. Found: C, 58.21; H, 7.78; N, 12.46.

EXAMPLE 16

A suspension of 0.62 g. of pyridoxal and 0.2 g. of Adams' platinum catalyst in 70 cc. of methyl alcohol containing 0.92 g. of 3,4-dihydroxy-β-phenylethylamine hydrobromide in solution is treated with 0.15 g. of sodium hydroxide pellets, and the mixture is hydrogenated at once. The theoretical amount of hydrogen is absorbed in less than ten minutes. The catalyst is collected on a filter, and the filtrate, cooled in ice, is made strongly acid with alcoholic hydrogen chloride. After slow crystallization, 0.74 g. (53%) of N-pyridoxyl-3,4-dihydroxy-β-phenylethylamine dihydrochloride is produced. For purification, this material is dissolved in 20 cc. of ice water, and is then treated with an excess of sodium bicarbonate. The resulting sticky oil is separated and a solution of it in alcohol is filtered through a sintered glass funnel. The clear filtrate, cooled in ice, is made acid with alcoholic hydrogen chloride. The pure crystals of N-pyridoxyl-3,4-dihydroxy-β-phenylethylamine dihydrochloride melt at 241–242° C. dec. The analytical sample is dried at 100° C. (1 mm.). Analysis.—Calc'd for $C_{16}H_{22}N_2O_4Cl_2$: C, 50.93; H, 5.88; N, 7.43. Found: C, 51.09; H, 5.62; N, 7.69.

EXAMPLE 17

If instead of immediately hydrogenating the product obtained by reacting pyridoxal with 3,4-dihydroxy-β-phenylethylamine (as described in Example 16), the reaction solution is allowed to stand, the product obtained is 1-(2-methyl-3-hydroxy-5-hydroxymethyl-4-pyridyl)-6,7-dihydroxy-1,2,3,4-tetrahydroisoquinoline, having the following formula:

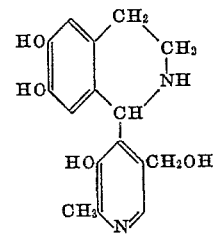

For example, a solution of 0.93 g. of 3,4-dihydroxy-β-phenylethylamine hydrobromide and 0.21 g. of potassium hydroxide in about 25 cc. of methyl alcohol is treated with 0.63 g. of pyridoxal. When most of the pyridoxal has disappeared, the solution is filtered. Crystals of the free base of the condensation product appear almost at once in the filtrate. After brief cooling, the crystals are collected on a filter and are washed with methyl alcohol. The crystals, suspended in ice cold ethyl alcohol, are converted to the hydrochloride by addition of alcoholic hydrogen chloride. Addition of ether fails to bring down anything but a small amorphous precipitate. The clear solution is decanted and concentrated to dryness under reduced pressure. The residue, dissolved in ice water, is neutralized with sodium bicarbonate. The thick precipitate which forms, is collected on a filter and washed thoroughly with water, alcohol and ether, and dried to produce 0.50 g. of 1-(2-methyl-3-hydroxy-5-hydroxymethyl-4-pyridyl)-6,7-dihydroxy-1,2,3,4-tetrahydroisoquinoline; M. P. 242–244° C. dec.; yield 44% of theory. The analytical sample is dried at 140° C. (1 mm.). Analysis.—Calc'd for $C_{16}H_{18}N_2O_4$: C, 63.56; H, 6.00; N, 9.27. Found: C, 63.16; H, 5.95; N, 9.09.

EXAMPLE 18

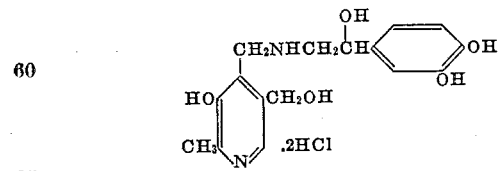

*N-pyridoxylarterenol dihydrochloride*

0.15 g. of sodium hydroxide is added to a suspension of 0.64 g. of pyridoxal and 0.15 g. of Adams' platinum catalyst in 50 cc. of methyl alcohol containing 0.79 g. of arterenol hydrochloride, [β-hydroxy-β-(3,4-dihydroxyphenyl)-ethylamine hydrochloride]. The mixture is immediately shaken with hydrogen. After fifteen minutes, the absorption of hydrogen ceases, and the solution appears colorless. A carbon dioxide atmosphere is maintained over the solution until it has been acidified with hydrogen chloride in methyl alcohol. Addition of ether causes crystallization of 0.93 g. (62%) of N-pyridoxyl-arterenol dihydrochloride. This material is purified by neutralization with aqueous sodium bicarbonate solution, solution of the free amine in ethyl alcohol, and subsequent reacidification with alcoholic hydrogen chloride. The purified N-pyridoxylarterenol hydrochloride [N-pyridoxyl-β-hydroxy-β-(3,4-dihydroxyphenyl)-ethylamine dihydrochloride] melts at 177–178° C., dec. The analytical sample dried at 100° C. (1 mm.) shows the following analysis:

*Analysis.*—Calc'd for $C_{16}H_{22}N_2O_5Cl_2$: C, 48.86; H, 5.64; N, 7.13. Found: C, 49.10, H, 5.83; N, 7.08.

Various changes and modifications may be made in carrying out the present invention without departing from the spirit and scope thereof. Insofar as these changes and modifications are within the purview of the annexed claims, they are to be considered as part of our invention.

We claim:
1. N-pyridoxyl-tyramine dihydrochloride.
2. N-pyridoxyl-β-phenyl-ethylamine dihydrochloride.
3. N-pyridoxyl-tryptamine hydrochloride.
4. N-pyridoxyl-histamine dihydrochloride.
5. N-pyridoxyl - β - hydroxy-β-(3,4-dihydroxy-phenyl)-ethylamine dihydrochloride.
6. Compounds selected from the group which consists of the following N-pyridoxyl-amines: N-pyridoxyl-tyramine, N-pyridoxyl - β - phenyl - ethylamine, N-pyridoxyl-tryptamine, N-pyridoxyl-pyridoxamine, N-pyridoxyl-benzylamine, N-pyridoxyl-isobutylamine, N-pyridoxyl-histamine, N-pyridoxyl-aniline, N-pyridoxyl-methylamine, N-pyridoxyl-ethylamine, N-pyridoxyl-γ-phenylpropylamine, N-pyridoxyl - β - hydroxyethylamine, N-pyridoxyl - β - hydroxy-propylamine, N-pyridoxyl-3,4-dihydroxy-β-phenyl-ethylamine, N-pyridoxyl - β - hydroxy - β - (3,4-dihydroxy-phenyl)-ethylamine; and hydrochloric acid salts of said N-pyridoxyl-amines.

References Cited in the file of this patent

UNITED STATES PATENTS

| Number | Name | Date |
|---|---|---|
| 2,540,946 | Hoffman et al. | Feb. 6, 1951 |

OTHER REFERENCES

Snell, "J. Biol. Chem.," vol. 154, pp. 313–314 (1944).

Sidgwick, "Organic Chemistry of Nitrogen" (Oxford Press; New York; 1942), page 16.

Karrer, "Organic Chemistry," 2nd ed. (Elsevier Publ. Co.; New York; 1946), page 124.

Degering, "Outline of Organic Nitrogen Compounds" (University Lithoprinters, Ypsilanti, Mich., 1945), pp. 298 and 299.